United States Patent [19]

Haverland, Jr. et al.

[11] Patent Number: 4,478,349
[45] Date of Patent: Oct. 23, 1984

[54] INSULATED DISH AND LID FOR MICROWAVE COOKING

[75] Inventors: Walter K. Haverland, Jr.; Patricia L. Haverland, both of Livermore, Calif.

[73] Assignee: Mirro Corporation, Manitowoc, Wis.

[21] Appl. No.: 220,192

[22] Filed: Dec. 23, 1980

Related U.S. Application Data

[63] Continuation of Ser. No. 2,875, Jan. 12, 1979, abandoned.

[51] Int. Cl.³ .................. B65D 25/18; H05B 6/64; A47J 27/00
[52] U.S. Cl. .................. 220/410; 126/389; 219/10.55 E; 220/94 A; 220/208; 220/366; 220/426
[58] Field of Search ............... 220/426, 428, 469, 366, 220/208, 410, 408, 94 A; 126/376, 377, 390, 389; 219/10.55 E, 10.55 M, 10.77

[56] References Cited

U.S. PATENT DOCUMENTS

| | | | |
|---|---|---|---|
| 274,461 | 3/1883 | Chalk | 220/469 X |
| 797,314 | 8/1905 | Owens | 220/413 |
| 1,093,648 | 4/1914 | Potter | 220/469 |
| 1,311,990 | 8/1919 | Moller | 220/446 X |
| 1,330,868 | 2/1920 | Harrison | 220/408 X |
| 1,499,364 | 7/1924 | Goodrick | 126/377 |
| 1,505,703 | 8/1924 | Darley | 126/376 |
| 1,541,799 | 6/1925 | Dodge | 220/408 |
| 1,549,743 | 8/1925 | Bultman et al. | 126/273.5 X |
| 1,749,433 | 3/1930 | Kussa et al. | 126/376 |
| 1,757,989 | 5/1930 | Acton | 126/390 |
| 2,024,511 | 12/1935 | Darlins | 220/366 X |
| 2,298,814 | 10/1942 | Weis | 220/380 |
| 2,681,211 | 6/1954 | Reynolds | 220/410 X |
| 3,302,632 | 2/1967 | Fichtner | 219/10.55 E |
| 3,349,941 | 10/1967 | Wanderer | 220/410 |
| 3,365,092 | 1/1968 | Blessing | 220/445 X |
| 3,651,981 | 3/1972 | Kinney | 220/366 X |
| 3,742,174 | 6/1973 | Harnden, Jr. | 219/10.77 X |
| 3,742,178 | 6/1973 | Harnden, Jr. | 219/10.77 |
| 3,745,290 | 7/1973 | Harnden, Jr. et al. | 220/408 X |
| 3,794,090 | 2/1974 | Commisso | 220/366 X |
| 3,934,748 | 1/1976 | Racz | 220/408 |
| 3,985,990 | 10/1976 | Levinson | 219/10.55 M X |
| 4,047,633 | 9/1977 | Trombly | 220/469 |
| 4,133,996 | 1/1979 | Freed | 219/10.55 E |

FOREIGN PATENT DOCUMENTS 2305366 10/1976 France ...................... 220/355

*Primary Examiner*—Allan N. Shoap
*Attorney, Agent, or Firm*—Hume, Clement, Brinks, Willian & Olds, Ltd.

[57] ABSTRACT

A thermally insulated vessel for cooking, serving, and storing of foods and beverages, particularly adapted for use in microwave cooking units. A double-walled vessel is provided, including an outer container and a removable inner container, both having substantially similar shapes. The inner container is supported by a grooved flange extending outward from its upper rim which rests on the upper rim of the outer container. The inner container and the outer container are separated by a narrow gap, forming an enclosed air cavity. The flange groove and rim are designed to allow air to escape from the cavity to relieve the pressure caused by hot foods or beverages in the vessel, and to resist air and liquid flow into the cavity as the vessel cools. A raised lid is further provided, fitting over the inner container, and having a flat top and a recessed handle, to allow several vessels to be stacked on each other for cooking or storing.

5 Claims, 5 Drawing Figures

INSULATED DISH AND LID FOR MICROWAVE COOKING

This application is a continuation of application Ser. No. 2,875, filed Jan. 12, 1979, now abandoned.

FIELD OF THE INVENTION

This invention pertains generally to the field of apparatus for food and beverages, more particularly to cookware and dishes for cooking, warming, serving, storing, and refrigerating foods and beverages, and especially to cookware designed for use with microwave ovens and induction heating devices.

DESCRIPTION OF THE PRIOR ART

Conventional cookware containers such as pots, pans, and roasters, are usually formed out of a single integral piece of material. These containers have the drawback that they become hot when the food is cooked in them, and therefore they require pot holders, hot pads, or other heat insulation devices for handling them when it is desired to serve the cooked food. When these hot containers are placed on a dining table, they create the danger of burns if they are touched inadvertently.

A second drawback of such containers is that when they are removed from the oven or stove, they lose heat very rapidly. As a result, the food in them tends to cool quickly, and subsequent servings during a meal are consequently degraded in taste. One conventional solution to this problem is to return the container to the oven, or to employ a hot plate or warming device, and to subject the food to low intensity heat to keep it warm during the meal. This solution entails the necessity of having such a heating device proximately available during the meal, and it normally causes the food to suffer deterioration in quality.

The problem of handling hot dishes during a meal may be alleviated by transferring the cooked food from the cooking vessel to a serving dish to be placed on the dining table. This causes the food to cool even more rapidly, since it loses heat immediately upon contact with the dish. The dish can be warmed in advance in a heating device to offset this cooling partially. Such preheating may result again in the danger of having a hot dish on the dining table. Further, the use of separate vessels for cooking and serving foods causes additional and unnecessary inconvenience.

Thermos bottles and double-walled insulating dishes have been used to store and handle hot (and cold) foods and beverages to maintain their temperature at a constant level over an extended period of time. Such containers are unsuitable for cooking food in conventional stoves or ovens because of the thermal resistance of the container walls to heat flow, which is the primary physical mechanism for heating the food in these ovens. Conversely, double boilers are double-walled containers in which the food is cooked by heating a liquid residing in the space between the walls, and therefore these boilers do not alleviate the problems of handling hot containers or rapid cooling of the food because of the low thermal resistance of their walls.

In their principle, microwave ovens offer advantages over conventional ranges which could solve the problems discussed above. A microwave oven heats or cooks the food by induction heating through the direct application of microwave radiation inside the oven. The cooking vessels used in these ovens are fabricated from materials which are generally transparent to this radiation, such as polycarbonate or polysulfone plastic. The radiation therefore heats the food directly without heat flow through the container walls. Of course, the container itself becomes hot during the cooking process, since it is in contact with the food. However, in theory a double-walled vessel can be used to cook or heat food in a microwave oven, and when it is removed the outer wall will remain cool to the touch and the food will remain hot in the dish for an extended period of time.

An alternative version of such a double-walled microwave cooking vessel has an inner wall that is constructed out of a material which absorbs microwave radiation and is thermally conductive, or partially conductive. The inner surface is heated by the radiation, and it cooks or heats the food by conduction.

The difficulty with conventional double-walled containers which are suitable for microwave cooking is that they are sealed off, so that the space between the walls is entirely isolated. When the air in this space is heated by the inner wall in contact with the food, it increases in pressure and tends to expand. This creates stresses in the walls that will deform them, causing the dish to bend out of shape, and may even result in cracking. Also, with the walls fastened together at a sealed joint, additional thermal stresses are developed when the inner wall is heated, causing further deformation of the dish.

Therefore, a conventional double-walled dish must be provided with sturdy mechanical supports to resist this wall deformation. This may be accomplished by designing the walls to be very thick, or by filling the space between them with a mechanically strong heat-insulating material, or even by providing support struts across this space. These measures result in a heavier, bulkier, and costlier dish with decreased thermal insulating efficiency and less food capacity, and some residual wall deformation.

An alternative measure is to provide vent holes to allow air to escape from the interior of the gap upon heating, thereby relieving much of the stress in the walls. However, foreign material may enter the gap through these holes, and water may become trapped there when the dish is washed. This again reduces the thermal insulating efficiency of the dish, and further leads to a cleaning problem for the gap interior. In short, no satisfactory design has been found for heat insulated cookware, despite many past attempts.

A further problem with conventional dishes is that space in most ovens is generally limited, and it is often difficult to fit more than one dish inside. It is desirable to provide a lid for oven cookware so that the containers can be stacked on each other in order to cook more than one food in the oven simultaneously. However, conventional lids for such cookware have handles or other upward projections which preclude the stacking of these dishes.

SUMMARY OF THE INVENTION

The present invention is a dish for cooking, storing and serving of foods and beverages. This dish is particularly suitable for cooking or heating with microwave ovens or other induction heating devices. The dish is a double-walled vessel with a narrow air space between the walls of an inner container and an outer container to provide thermal insulation. The inner container is supported by a flange around its upper rim extending outward and resting on the rim of the outer container, thereby allowing the two containers to be separated easily. The rim of the outer container fits into a groove on the underside of this flange. The rim and groove are designed to allow air to escape from the space between the walls while the food is being cooked, and to form a seal which prevents the influx of air into the gap after the dish is removed from the oven. The dish is further provided with a lid which rests on the rim of the inner container and is raised above this rim. The lid has a handle which is recessed into this raised space, so that the upper surface of the lid is flat with no upward projections.

It is an object of this invention to provide a heat insulated vessel for cooking and heating foods and beverages in a microwave oven, such that while the contents are hot the outer surface of the vessel remains cool to the touch.

A second object of this invention is to provide a heat insulated vessel for cooking and heating foods and beverages in a microwave oven, such that the temperature of the heated contents will be maintained at a constant level for an extended period of time when the vessel is removed from the oven.

Another object of this invention is to provide a heat insulated vessel for cooking and heating foods and beverages in a microwave oven, such that the vessel is relatively light-weight, thin-walled, non-bulky, simple and inexpensive in construction, and unsusceptible to thermal deformation.

The above objects are not limited strictly to use of the vessel in a microwave oven, but they also encompass its use with induction heating devices and other cooking and heating devices which do not depend for their operation on the flow of heat through the walls of the vessel.

Another object of this invention is to provide a vessel for cooking and heating foods and beverages that is aesthetically and functionally suitable for serving and storing the contents during and after a meal.

A further object of this invention is to provide a vessel for cooking and storing foods and beverages with a lid such that a plurality of vessels may be stacked on each other in order to conserve space.

These and other objects, characteristics, and features of this invention may be better understood by examining the following drawings, together with the detailed description.

DETAILED DESCRIPTION OF THE INVENTION

Figure 1:
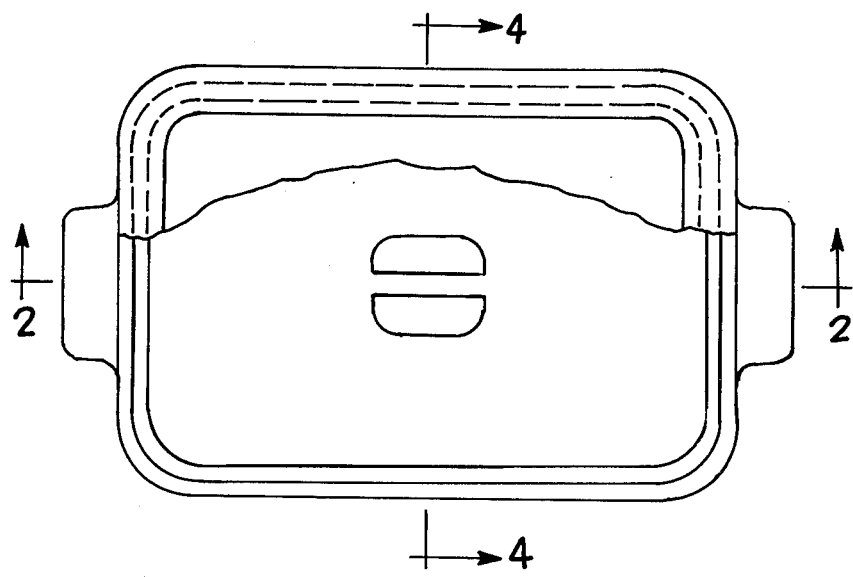
FIG. 1 is a plan view of the preferred embodiment of an assembled heat insulated cooking vessel with a lid according to the present invention.
Figure 2:
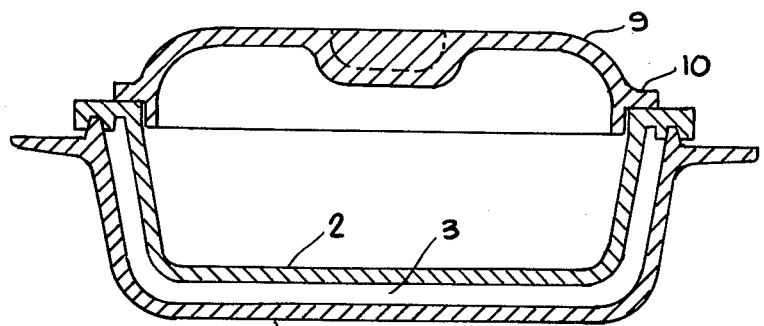
FIG. 2 is a sectional elevation view of the vessel of FIG. 1 taken along the lines 2—2, showing the double-walled construction of the vessel with the lid in place.
Figure 3:
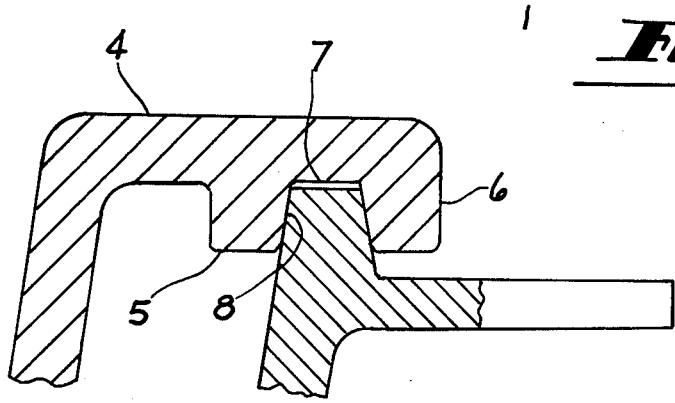
FIG. 3 is a magnified fragmentary view of the rim and groove forming the valve means between the inner and outer containers in FIG. 2.
Figure 4:
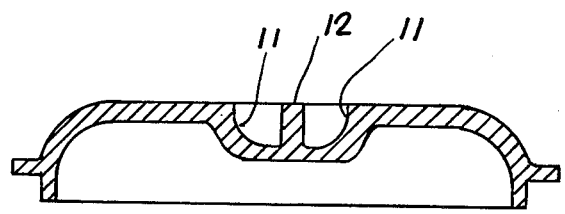
FIG. 4 is a sectional elevation view of the lid taken along the lines 4—4 in FIG. 1, showing the construction of the recessed handle.
Figure 5:
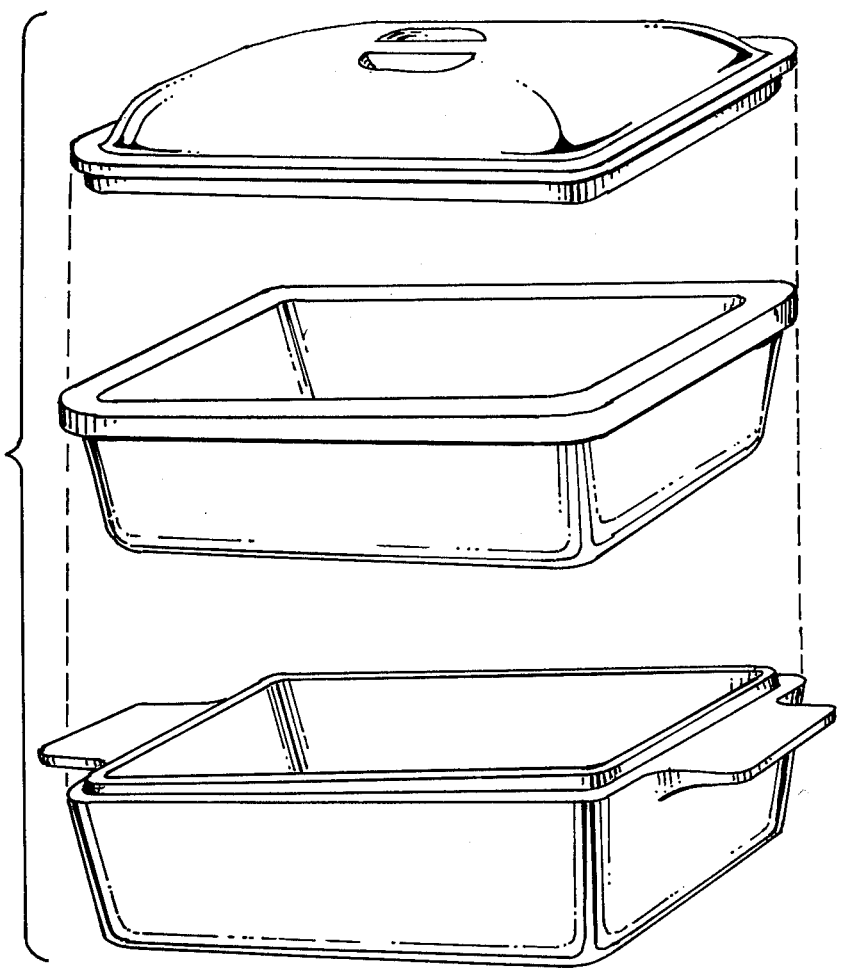
FIG. 5 shows an exploded view of the vessel of FIG. 1.

Referring to the drawings, the preferred embodiment of this invention comprises three distinct parts: an outer container 1, an inner container 2, and a lid 9. The inner container 1 and outer container 2 are thin-walled, having substantially similar geometric shapes and being open on top. The inner container 2 is slightly smaller than the outer container 1 to allow the inner container 2 to fit into the outer container 1 with sufficient clearance to leave a narrow gap 3 between the wall of the two containers.

The inner container 2 has a flange 4 extending outward around its circumference, projecting sufficiently far to cover entirely the rim 8 of the outer container 1 when the two containers are nested together. The underside of this flange 4 is provided with inner and outer parallel ridges 5 and 6 respectively, around the circumference, extending a short distance downward, with a narrow groove 7 between them. These ridges 5 and 6 are located such that the upper rim 8 of the outer container 1 fits snugly into the groove 7 when the containers are nested. Thus, the inner container 2 is supported solely by this flange 4 resting on the upper rim 8 of the outer container 1.

The portion of the rim 8 lying between the ridges 5 and 6 is slightly wedge-shaped; that is, the inner and outer lateral surfaces of this rim 8 between the ridges 5 and 6 are slightly oblique relative to each other, so that the upper edge of the rim 8 is slightly thinner than the wall in the main body of the outer container 1. The lateral surfaces of the ridges adjacent to the groove 7 are beveled correspondingly parallel to these oblique rim surfaces, so that the inner and outer lateral surfaces of the rim 8 and the ridges 5 and 6 fit flush against each other when the dish is assembled. The downward force on the inner container 2 arising from its own weight plus the weight of its contents thereby produces a very close fit in the joint between the two containers 1 and 2.

This design of the flange groove 7 and rim 8 has the desirable feature of one-way valve action on the air in the gap 3 between the two containers 1 and 2. When the contents of the dish are heated, the inner container 2 becomes hot, and the temperature and pressure of the air in this gap 3 increase. This pressure tends to force the inner container 2 upward, dislodging the flange 4 from the rim 8 slightly and allowing the heated air to escape across the groove 7. The stresses in the walls of the inner container 1 and outer container 2 produced by the increased air pressure are thereby relieved. When the dish is removed from the oven and the air in this gap 3 begins to cool, its pressure falls below that of the atmosphere. The atmospheric pressure on the two containers 1 and 2 in combination with the weight of the inner container 2 and its contents forces the flange groove 7 downward against the rim 8 and produces a joint so tight that the cavity or gap 3 between the containers 1 and 2 becomes hermetically sealed. Air is prevented from flowing into the gap 3 which remains under a partial vacuum for an extended period of time, thereby enhancing the heat insulating characteristics of the dish.

A lid 9 is also provided, fitting over the open top of the inner container 2 and having a flange 10 around its circumference extending a short distance outward and resting on the flange 4 of the inner container 2, when the lid 9 is in place. The lid 9 arches upward from this flange 4, and the central portion of the lid 9 has a flat upper surface 13 which is raised above the level of the flange 10. In the center of the lid is an indented region recessed below this flat upper surface 13, forming a well 11. A thin vertical slab 12 extends across, and projects upward from, the bottom of this well 11, and the upper edge of this slab 12 lies flush in the plane of the flat upper surface 13 of the lid 9. The slab 12 thereby forms a recessed handle for the lid 9.

This lid design allows the flat bottom of one dish to be placed on the flat lid surface of another dish, so that the dishes can be stacked to achieve greater economy of space. The raised lid 9 ensures that there is sufficient space between the contents of stacked dishes so that when they are placed in a microwave oven these contents will cook simultaneously. With several such dishes it is possible thereby to utilize the cooking space in the microwave oven with maximum efficiency.

A preferred material for this dish is polysulfone plastic, sold by Union Carbide Corporation under the trademark Udel. The components of the container may be fabricated from this plastic by the injection mold process, a technique which is well-known to persons skilled in the relevant art. This material has the features of being transparent to microwave radiation, safe in contact with foods, resistant to chemical attack by grease, and aesthetically pleasing in appearance. The material is further able to withstand temperatures as high as 400° Fahrenheit, and indeed the dish may be used even to cook foods in conventional ovens up to this temperature. The material is strong, rigid, and resistant to mars and scratches. However, the invention is not limited in any way to this material, and embodiments employing all other suitable materials are included in its scope. The material must be nonmetallic, and it should be preferably non heat conducting.

From the above description, it is seen that this invention is suitable for serving food during a meal and for storing food as well as for cooking or heating. The inner container 2 may be removed with the lid 9 and contents and stored in a refrigerator, while the outer container 1 may be used for any other purpose, such as cooking with another inner container liner vessel. With several such dishes the inner container 2 and outer container 1 may be used interchangeably, providing great flexibility and convenience. This invention provides a means for cooking, serving and storing foods and beverages in a single container. This feature, as well as the desirable heat insulating properties of the dish, make it a very useful cookware device.

Though the embodiments hereinbefore described are preferred, many modifications and refinements which do not depart from the true spirit and scope of the invention may be conceived by those skilled in the art. It is intended that all such modifications be covered by the following claims.

What is claimed is:

1. A microwave cooking vessel comprising:
    an outer container having a plastic floor and plastic walls;
    an upper rim forming the upper periphery of said outer container, said upper rim being beveled;
    at least one handle extending outwardly from said outer container at a point below said upper rim;
    an inner container having a plastic floor and plastic walls;
    a flange extending outwardly from and circumscribing the upper periphery of said inner container, said flange including a groove having a shape corresponding to said rim;
    said rim frictionally engaging said groove so that said inner container is removably supported within said outer container to define a fluid containing cavity between the floor and walls of said inner container and the floor and walls of said outer container; and
    said groove and said upper rim cooperating by relative movement therebetween to provide valve means for allowing fluid to escape from said cavity whereby said groove defining flange moves upwardly to disengage said upper rim from said groove when said fluid containing cavity is heated, and said groove defining flange moves downwardly to sealingly engage said upper rim when said cavity is cooled.

2. The microwave cooking vessel of claim 1 further including:
    a lid for covering said inner container, said lid having flange means extending outwardly from and defining a peripheral edge of said lid for supporting said lid on said inner container, said lid arching upward from said flange means to a flat upper surface having a recessed portion with an interior projection terminating at or below said flat upper surface.

3. A microwave cooking vessel comprising:
    an outer container constructed from a thermoplastic plastic;
    an upper rim along the upper periphery of said outer container;
    an inner container constructed from a thermoplastic plastic and shaped substantially similar to said outer container and being removably positioned within said outer container;
    a flange extending outwardly from and circumscribing the upper periphery of said inner container, said flange defining a groove for receiving said upper rim so that said inner container is removably supported within said outer container to define an air containing cavity between said inner and outer containers, said upper rim is beveled and said groove defining flange is of a corresponding shape so that said rim frictionally engages said groove when said inner container is received by said outer container, and said groove and said upper rim cooperating by relative movement therebetween to provide valve means for allowing fluid to escape from said cavity whereby said groove defining flange moves upwardly to disengage said upper rim from said groove defining flange when said air containing cavity is heated, and thereafter said groove defining flange moves downwardly to sealingly engage said upper rim and groove defining flange when said cavity is cooled; and
    a lid constructed from a thermoplastic plastic and dimensioned to cover an opening in said inner container, said lid having flange means extending outwardly from, and defining a peripheral edge of said lid for supporting said lid on said inner container, a lower rim extending downwardly from a point adjacent said flange means and having a smaller circumference than the opening in said inner container so that said lower rim is received within the opening in said inner container when said lid is supported on said inner container, said lid arching upward from said flange means to a substantially flat upper surface having a recessed portion with an internal projecting handle terminating at or below said flat upper surface.

4. A microwave cooking vessel comprising:
    a plastic outer container;

a plastic inner container shaped substantially similar to said outer container, removably positioned within said outer container;

an upper rim along the upper periphery of said outer container supporting said inner container so that said inner container and said outer container are separated by a fluid containing cavity, said upper rim being beveled;

a flange extending outwardly from and circumscribing the upper periphery of said inner rim, said flange including two ridges projecting downwardly and circumscribing the underside of said flange to define a groove between said ridges, said ridges being postioned adjacent to and abutting said rim when said inner container is supported within said outer container so that said groove receives said rim and thus supports said inner container;

said groove and said rim cooperating to provide valve means for allowing fluid to escape from said cavity when said cavity is subjected to heating and preventing fluid from entering said cavity when said cavity is subject to cooling thereafter, said flange and said upper cooperating by relative movement therebetween; and said beveled upper rim of said outer container is slidably positioned in said groove so that an increase in the fluid pressure of said cavity causes said flange of said inner container to move upwardly disengaging said rim from said groove and reducing the fluid pressure in said cavity.

5. The microwave cooking vessel of claim 4 wherein said vessel is constructed from a thermoplastic plastic.

* * * * *